Patented Oct. 14, 1947

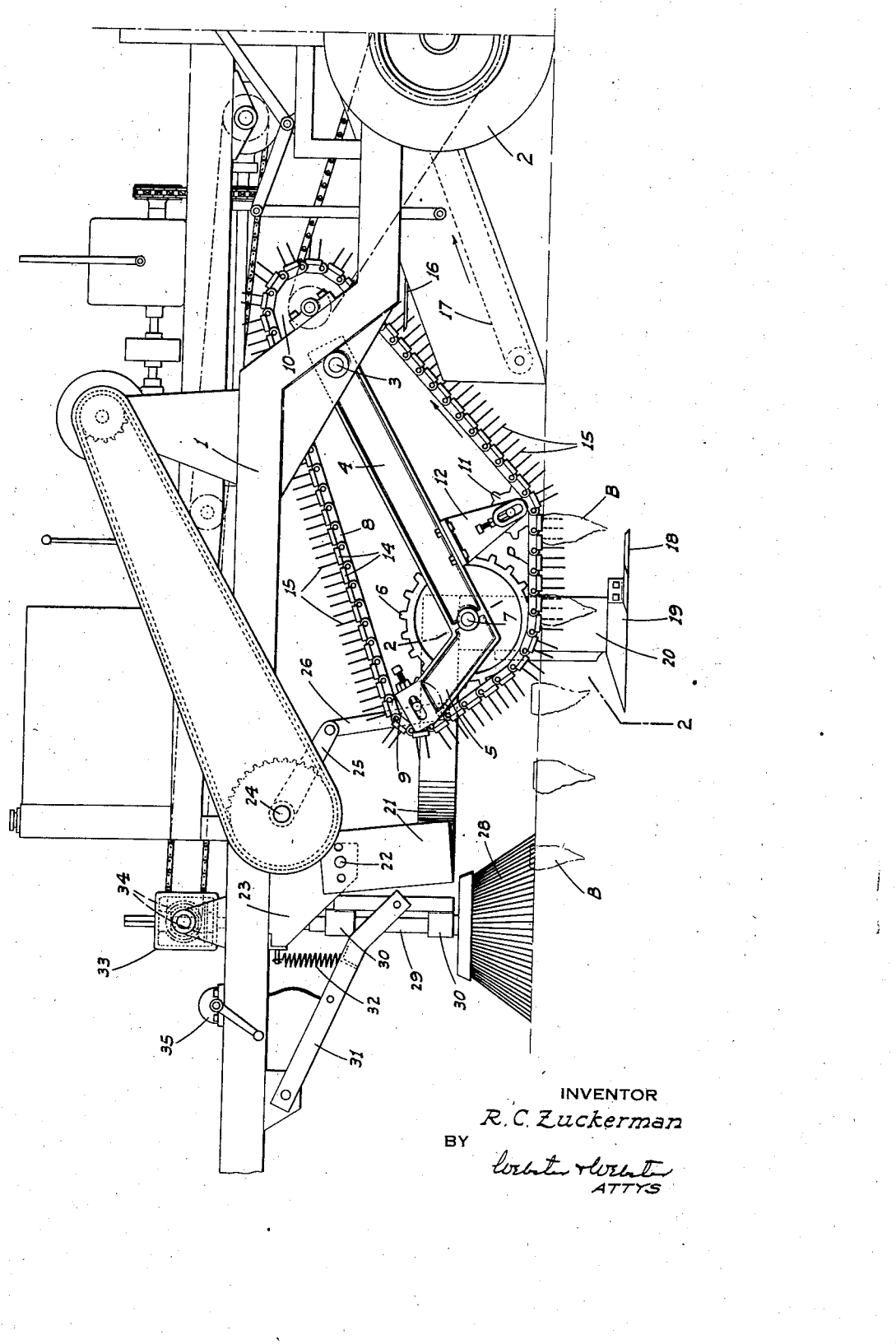

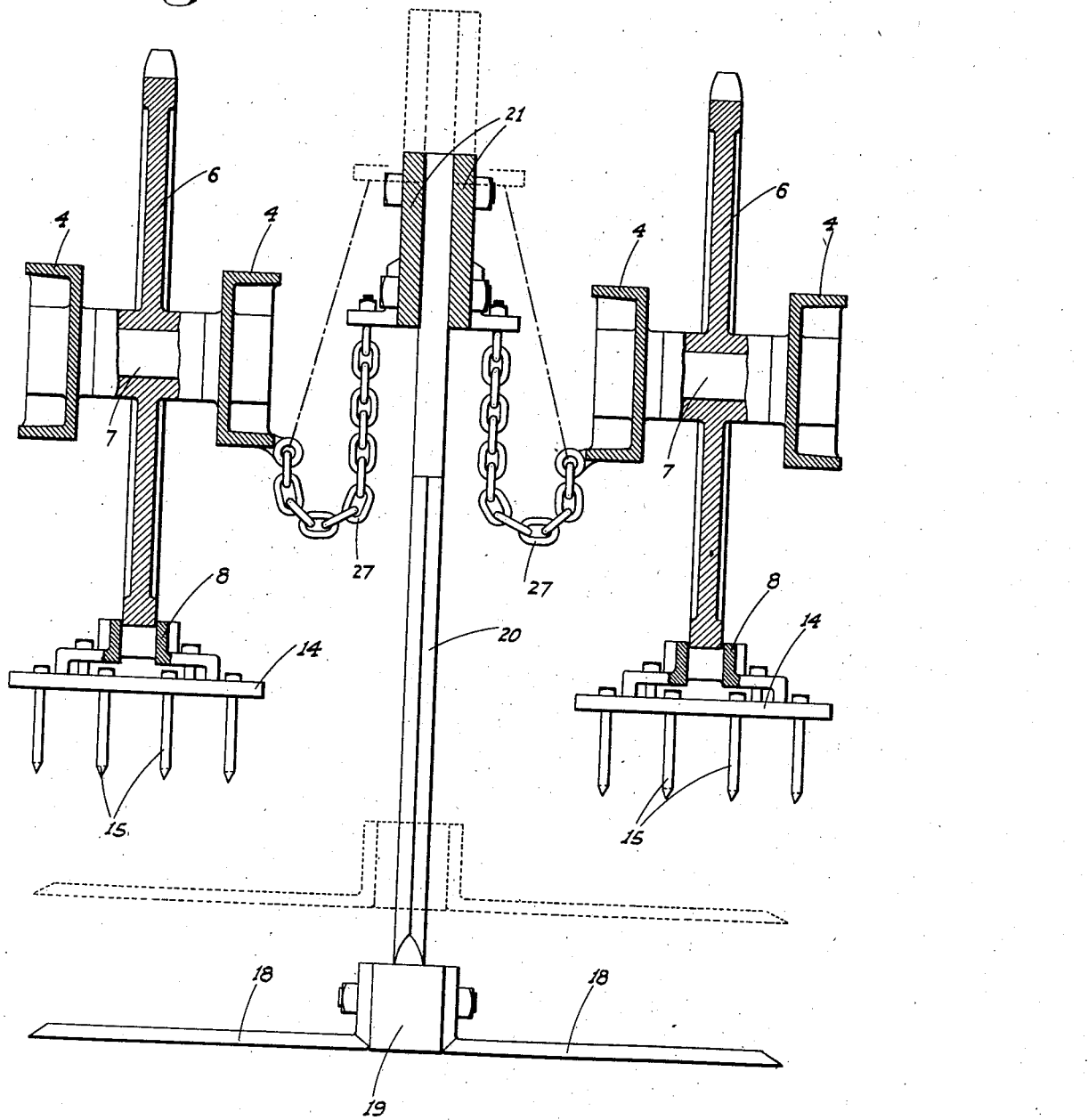

2,428,904

UNITED STATES PATENT OFFICE 2,428,904

BEET HARVESTER

Roscoe C. Zuckerman, Stockton, Calif.

Application February 7, 1944, Serial No. 521,300

4 Claims. (Cl. 55—9)

1

This invention relates to a beet harvesting machine, for engaging and withdrawing beets, preferably already topped, from the ground.

The principal object of my invention is to provide a harvesting machine for the purpose, having what I believe to be a novel unit for engaging and lifting the beets in such a manner that said beets are initially impaled while the ground is broken or loosened under them, and the beets are then lifted out of the ground with a continuous upward as well as rearward motion.

Another object is to construct and arrange the lifting unit on the machine so that the beets as lifted on the ground continuously move rearwardly in a hung or suspended position until they are stripped off, and ample space and opportunity are provided for the cleaning of the beets and for dirt, etc., to drop therefrom after the beets are lifted and before they are stripped off, and without any dirt being liable to drop onto the unit or any other part of the machine.

As stated, the beets are preferably impaled after they have been previously topped, and another object is to provide a device, mounted on the machine ahead of the impaling and lifting unit, to clear the cut tops, etc., away from the beets so that the latter remain in a clean and unobstructed condition for impalement.

The machine includes a ground and beet loosening plow device disposed below the impaling unit, and another object is to mount the plow in connection with said unit so that when the plow is lifted clear of the ground, the impaling unit will also be lifted. At the same time, when the plow and impaling unit are in operative position, said unit can yield vertically independently of the plow, and the latter may be set to operate at different selective depths without disturbing the necessary floating action of the impaling and pick-up unit.

The above and other objects are accomplished by means of such structure and relative arrangement of parts as will fully appear by a perusal of the following specification and claims.

In the drawings similar characters of reference indicate corresponding parts in the several views:

Figure 1 is a fragmentary side elevation of the improved beet harvester, showing particularly the novel impaling and pick-up unit and adjacent cooperating parts.

Figure 2 is an enlarged fragmentary transverse section on the line 2—2 of Fig. 1.

Referring now more particularly to the characters of reference on the drawings, the harvester comprises a main frame including spaced side beams 1, adapted for connection to a draft tractor and having rear supporting wheels 2.

Mounted on the beams intermediate their ends is a cross shaft 3, swivelly hung on which are a pair of transversely spaced downwardly and forwardly projecting and independently floating auxiliary frames, each of which comprises a pair of transversely spaced beams 4 having relatively short upwardly and forwardly projecting portions 5 at their forward end. A large sprocket wheel 6 is disposed between each pair of frames 4 adjacent their lower ends, said wheel being mounted on a shaft 7 supported by said frames.

An endless chain consisting entirely of attachment links 8 extends about and engages the under side of sprocket 6; the chain in front of the sprocket passing up at a somewhat steep angle and over an adjustable sprocket wheel 9 mounted between the extensions 5 at their upper end. The chain then passes rearwardly and over another sprocket wheel 10 journaled in connection with the main frame a short distance back of the shaft 3, and then forwardly and down to the sprocket 6. In order to maintain the portion of this lower run of the chain which is near the sprocket 6 substantially horizontal, however, a deflecting or idler sprocket 11 engages said chain a predetermined distance rearwardly of the sprocket 6. This sprocket 11 is mounted between brackets 12 secured on and depending from the frames 4 for adjustment lengthwise thereof, while the sprocket itself is adjustable in the brackets in a direction at right angles to the adjusting movement of the brackets. In this manner, the straight portion P of the chain between the sprockets 6 and 11 may be adjusted both as to its length and as to its angle if any relative to a horizontal plane; the lower run of the chain between the sprockets 11 and 10 extending upwardly at a considerable angle.

The sprocket 10 is releasably driven from one of the wheels 2 in any suitable manner, such as by a chain drive 13, in a direction to cause the lower run of the chain to travel upwardly and rearwardly, at the same linear speed as the forward travel of the machine along the ground.

A relatively long cross plate 14 is removably mounted on each link 8, and a plurality of straight pointed prongs or spikes 15 project outwardly from the plate. The plates and spikes are arranged so that when any portion of the chain is straight, the corresponding spikes are spaced relatively close together, as shown. The advantage of this mounting of the spikes by means of the plates 14 is that any one plate along the chain may be readily removed therefrom for replacing of the spikes without removing the chain from its sprockets and with a minimum of disturbance generally.

In operation, as the machine advances, the portion of the lower run of the chain between the sprockets 6 and 11 remains adjacent and substantially parallel to the ground in the manner of an endless track, and the corresponding spikes depend straight down. Said spikes are thus directly above and straight over the beets at the time of their contact therewith, so that they will cleanly impale any beets B which may be in their path; the free floating mounting of the frames 4 on which the chain and spikes are mounted enabling the chain to accommodate itself to any variation in the level of the exposed beet crowns.

As the lower run of the chain makes a turn about the sprocket 11 and travels upwardly, the impaled beets are withdrawn cleanly out of the ground and will continue to travel rearwardly and in suspended or hanging relation until they are stripped off the spikes. This may be accomplished by a suitable stripping means, such as is indicated at 16, which is disposed so that the beets as stripped will fall of themselves onto an elevator 17 which is overhung by the adjacent portion of the chain. By this arrangement, stripping is facilitated, the beets do not have to be lifted off the spikes, and any dirt, etc., which may be initially raised by the spikes will fall clear of itself.

In connection with the beet engaging and lifting chain, a suitable loosening plow unit is provided. This unit comprises a pair of rearwardly diverging plow blades 18, disposed a certain distance below the lower horizontal portion of the chains, and projecting laterally from a forwardly facing chisel-like shoe 19. This shoe extends lengthwise of the machine and is mounted on the lower end of a standard 20 which projects centrally between the pairs of frames 4 of the beet engaging units, as shown in Fig. 2. The standard is supported by a pair of forwardly extending diverging arm units 21 which at their forward end are adjustably pivoted as at 22 on brackets 23 secured on the frame beams 1.

In order to adjustably maintain the plow unit at a set depth, a power driven, manually controlled shaft 24 is mounted on the main frame of the machine transversely above the arm unit 21, and having a rearwardly extending arm 25 which is operatively connected to said arm unit intermediate its ends by a link 26. This device, besides enabling the plow unit to be held at a desired depth, provides for lifting the unit clear of the ground for transportation. In order to provide for the lifting of the beet pick-up unit by the same means, and without affecting the desired independent yielding of said pick-up unit when in operation, the arms 21 adjacent the standard 20 are connected by chains 27 or similar flexible elements with the frames 4, as shown in Fig. 2. Said chains are normally slack, so that the frames 4 can shift up or down a certain distance without restraint, but become taut when the plow standard has been lifted to a point short of ground level, or so that a lifting movement will then be imparted to the pick-up unit before the relatively wide blades 18 can contact and damage the spikes 15 as indicated in dotted lines in Fig. 2.

As previously indicated, the beets are topped while in the ground and before they are harvested or picked up, and in order to present the cut crowns of the beets in a clean condition for engagement by the spikes, so as to prevent the latter possibly engaging the removed tops, clods, etc., a rotary vertical-axis brush 28 is disposed in front of the pick-up unit a certain distance, the diameter of the brush being sufficient to embrace two adjacent rows of beets. This brush is mounted on a vertical shaft 29 held against axial movement in bearings 30 supported by a forwardly projecting pivoted arm unit 31, which is mounted on the frame 1 and which is yieldably suspended from a spring 32 so that the brush may give with ground inequalities. In order to drive the shaft 29 irrespective of its vertical or tilted position, the shaft slidably projects through a transversely swingable gear box 33. This gear box contains a pair of beveled gears 34, one being engine driven and mounted concentric with the axis of swinging of the box, while the other gear slidably but non-turnably engages the shaft 29. Suitable hoisting means indicated at 35 and applied to the arm unit 31 may be provided to lift the brush well clear of the ground when the machine is not in use.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A beet harvesting machine including a main frame movable along the ground, an auxiliary frame mounted on the main frame and extending in forwardly depending relation therefrom to a point adjacent the ground, a relatively short projection on the lower end of the auxiliary frame extending forwardly and upwardly at an acute angle to the ground, a bracket extending at substantially right angles to the auxiliary frame at a point spaced a predetermined distance from the juncture of the auxiliary frame and said projection, a chain supporting wheel mounted in the outer end of the projection, a chain supporting wheel mounted adjacent the juncture of the auxiliary frame and the projection, a chain supporting wheel mounted in the outer end of the bracket, a chain supporting wheel mounted at the upper end of the auxiliary frame, an endless chain supported about said chain supporting wheels, means to drive the chain, and beet impaling spikes mounted on the chain.

2. A beet harvester including a main frame movable along the ground, a free floating auxiliary frame pivotally mounted on the main frame and extending in forwardly depending relation to a point adjacent the ground, an endless driven chain mounted for movement about the auxiliary frame, beet impaling spikes on the chain, the chain in its travel being adapted to progressively bring the spikes adjacent beets in the ground, whereupon the weight of the auxiliary frame and its associated parts causes the spikes to impale the beets and continued movement of the chain lifts them from the ground, means mounted on the main frame ahead of the auxiliary frame and operable to clean the tops of the beets to facilitate such impaling thereof by the spikes, such latter means comprising a bearing frame yieldingly mounted on the main frame, a brush, a shaft on the brush journaled in the bearing frame and held against longitudinal axial movement, and means to drive the shaft.

3. A beet pick-up machine including a main frame movable along the ground, a beet pick-up unit pivotally mounted on the main frame and at its lower end engaging the ground in yielding relation thereto and operable to engage and lift beets from the ground, a plow normally movable along in the ground under the pick-up unit, a vertical standard on the plow extending upwardly adjacent but to one side of the pick-up unit, a bracket on the main frame ahead of the pick-up unit and extending downwardly therefrom, an arm pivoted to the bracket and projecting therefrom toward the unit and connected at its outer end with the vertical plow standard, means to swing the arm upwardly to lift the plow, and a normally slack chain interconnected between the outer end of the arm and the pick-up unit whereby upon upward swinging movement of the arm the plow will first be lifted a predetermined distance below the unit and then the plow and unit will be lifted together.

4. A device as in claim 3 in which the arm lifting means comprises a power driven shaft journaled in the main frame above the arm, a crank arm fixed to the shaft and a link connected between the crank arm and the first named arm.

ROSCOE C. ZUCKERMAN.

REFERENCES CITED

The following references are of record in the file of this patent:

UNITED STATES PATENTS

| Number | Name | Date |
|---|---|---|
| 804,172 | Pruvot | Nov. 7, 1905 |
| 917,769 | Kile | Apr. 13, 1909 |
| 919,342 | Gettelmann | Apr. 27, 1909 |
| 962,880 | Barber | June 28, 1910 |
| 1,069,380 | Bocker | Aug. 5, 1913 |
| 1,210,057 | Fanger | Dec. 26, 1916 |
| 1,272,604 | Beale | July 16, 1918 |
| 1,291,567 | Liebau | Jan. 14, 1919 |
| 1,300,955 | Green | Apr. 15, 1919 |
| 1,315,381 | Merchant | Sept. 9, 1919 |
| 1,445,535 | Moreschini | Feb. 13, 1923 |
| 1,714,617 | Parker | May 28, 1929 |
| 2,084,398 | Jongeneel | June 22, 1937 |
| 2,139,802 | Catchpole | Dec. 13, 1938 |
| 2,376,950 | Wilkins | May 29, 1945 |

FOREIGN PATENTS

| Number | Country | Date |
|---|---|---|
| 40,792 | Denmark | Sept. 16, 1929 |